P. MUELLER.
HANDLE FOR COCKS, FAUCETS, AND VALVES.
APPLICATION FILED OCT. 2, 1909.
995,027.
Patented June 13, 1911.
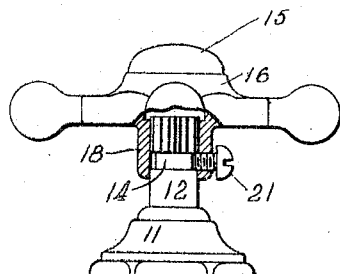
Fig. 1.
Fig. 2.
Fig. 3.
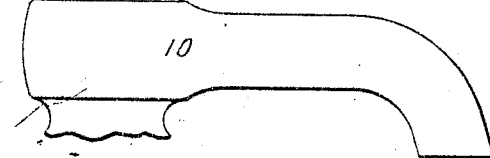
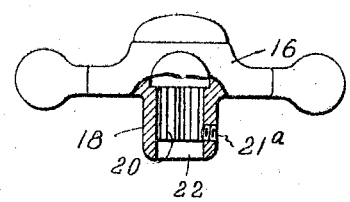
Fig. 7.
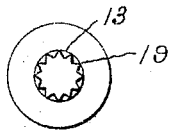
Fig. 4.
Fig. 5.
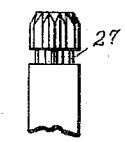
Fig. 8.
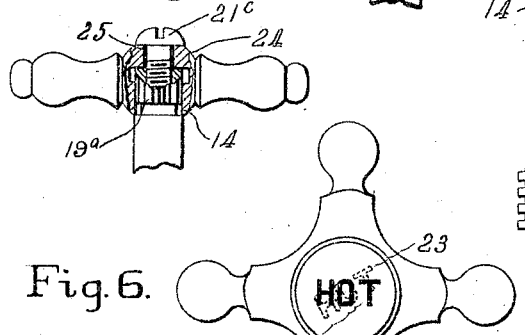
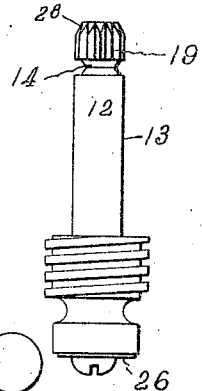
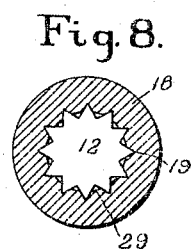
Fig. 6.
Witnesses.
Chester W. Hathaway.
Virginia Hamilton
Inventor
Philip Mueller.
by Meyers, Cushman & Rea
Attorney.

UNITED STATES PATENT OFFICE.

PHILIP MUELLER, OF DECATUR, ILLINOIS, ASSIGNOR TO THE H. MUELLER MANUFACTURING COMPANY, OF DECATUR, ILLINOIS, A CORPORATION OF ILLINOIS.

HANDLE FOR COCKS, FAUCETS, AND VALVES.

995,027.

Specification of Letters Patent. Patented June 13, 1911.

Application filed October 2, 1909. Serial No. 520,687.

*To all whom it may concern:*

Be it known that I, PHILIP MUELLER, a citizen of the United States, residing at Decatur, in the county of Macon and State of Illinois, have invented new and useful Improvements in Handles for Cocks, Faucets, and Valves, of which the following is a specification.

This invention relates to cocks, faucets and valves, and more particularly to handles for cocks, faucets and valves in liquid distribution.

An object of the device is to facilitate the assembling of the many parts of cocks, faucets or valves quickly, and at the same time securing ready adjustment of the handle to the stem.

Another object is to provide means for readily adapting handles of varying styles to the same valve without the necessity of filing or machining the parts, thus reducing the cost of the handle, and accommodating the ready fitting of the handle to different valve stems or different handles to the same stem as desired.

Another object is to provide for the readjustment of a handle to the stem if the wear of the valve has caused the parts to close in a manner to set the handle out of alinement. Such alinement may be either caused from the form of the handle or the reading of an index on the same, but for the most part it pertains to the latter.

The invention is exemplified in the structure herein described, and shown in the drawings forming a part of this specification and more particularly defined in the appended claims.

In the drawings herewith I have illustrated several embodiments of my invention, and in said drawings: Figure 1 is the uppermost portion of a cock in elevation embodying my invention, showing the handle and stem connection in section. Fig. 2 is the handle in elevation partly in section. Fig. 3 is a top view of handle connecting end of the stem. Fig. 4 the stem in elevation. Fig. 5 is a modification of a handle and its attachment. Fig. 6 is a top view of the handle showing the index. Fig. 7 is an elevation of the upper end of a stem somewhat similar to that shown in Fig. 5, but the flutings are carried deeper and to the bottom of the groove, while the upper end is beveled slightly as in the form of Fig. 4, and Fig. 8 is an enlarged cross section of the lower end of the handle of Fig. 2.

Referring to the drawings by numbers, like numerals indicate like parts in the several views.

10 indicates a portion of the cock body which may be of any suitable construction.

11 is a gland nut or packing nut through which the usual valve stem passes, and which is of any well known type.

In manufacturing cocks, faucets or valves it is the present custom to provide the end of the stem which receives the handle with a tapered square and the handle attaching portion is likewise provided with an internal square to correspond with that on the stem, and they are fitted together and attached by various means. In this present method of manufacturing it is impossible to interchange the different design of handles, such as four arm, cross, index, or wheel handles and other styles to the same stem without filing or machining the stem in order to fit the same.

In my present invention I obviate the necessity of additional work in interchanging the various styles of handles when adapting them to one stem or similar stems regardless of the style of the cock, and I accomplish this by providing the handle with internal corrugations for the receipt of exterior corrugations on the stem, and I further provide for the receipt of a set screw below the corrugation for attaching the parts and for readily assembling or interchanging them as the demand may arise.

Rotatively mounted within said valve body and passing through said gland nut is the stem of the cock, which is preferably of the form shown in Fig. 4 although the same may be of any well known design, the portion passing through said gland nut being circular. the outer extremity of the stem 12 is ribbed or corrugated longitudinally as at 19 (see Figs. 3 and 4) the greatest diameter of said corrugation being not larger than the greatest diameter of the stem 12 where it passes through said gland nut, or as at 13. Below said ribs or corrugations 19 is a neck 14 of less diameter than the greatest diameters of both the stem 12 and the corrugations 19, thus allowing for attachment of the handle and the connecting parts hereinafter more fully explained.

A handle 16 which may or may not bear an index member 15 (Fig. 1) bears a receiving neck 18; the said neck 18 being interiorly grooved or corrugated as at 20 in a manner to slidably engage the ribs or corrugation 19 on the stem 12, said grooves or corrugations 20 being longitudinally of the neck 18; and on the perimeter of said neck 18 in a position to enter the diminished portion of the stem 12 adjacent the neck 14 is provided a set screw 21 which attaches the handle and stem in fixed relation to each other. The lower or outer portion of the handle neck 18 is preferably of a length to envelop the reduced portion 14 of the stem as is shown at 22 in Fig. 2. Thus when the handle 16 and the stem portion 19 are attached the connection has a very close and neat appearance and the lower edge of 14 is covered from view and from the collection of unsanitary matter, the screw hole 21ᵃ being located at the upper edge of the smooth surface 22, and they co-act in retaining the handle on the stem.

The arrangement of the corrugations or ribs 19 and the grooves or ribs 20 may differ as to their number or vary in the degree of serration without departing from the spirit of my invention, the same effecting only the degree of adjustment of the parts and the taking up of wear or the correct setting of the index, but I prefer a medium serration to accommodate proper use. I intend that the matter of index adjustment either at the making of the article or after wear, shall be fully taken care of, and for this reason the varying in degrees of serration must be considered, in view of obviating a variance in indexes as seen at 23 in Fig. 6.

It will be seen that the construction of the handle 16 readily lends itself to convenient assembling with the stem, the set screw being in place securing the parts and the same ready for use.

In Fig. 5 I have shown a slightly different form of handle as 24 fitted to the same or similar stem to 19, and in which connection there is no function to be performed by the diminished portion 14. However, the same is here shown in order to demonstrate the universality between the connecting parts. The body of the handle 24 is internally grooved or fluted to engage the stem 19ᵃ and is centrally bored from the top as at 25, as is likewise the upper end of the stem 19ᵃ for the receipt of a screw 21ᶜ which holds the parts in an assembled relation. The general assembling of the handle and stem is for the most part the same as herein set forth, and which it is believed will be readily understood.

Taking up the use of valves, the wear hereinbefore referred to is on the washer or disk 26 as in Fig. 4, and as this wears the fitting of the stem to completely close off the valve assumes a different position or demands a greater number of rotations, and in so doing the index is gradually thrown from alinement and changes in accordance with this wear as will be noted at 23 in Fig. 6. To accommodate such wear with my arrangement, the handle is removed and by means of the varying degrees of adjustment permitted between the grooves 20 and the ribs or corrugations 19 of the stem, the handle is immediately replaced to read correctly, and is again adjusted to the stem so that when the change is made the index will read correctly or as shown in heavy line at 17 in Fig. 6.

What I claim is,—

1. In a valve, a fixed member, a movable controlling member subject to wear, a stem therefor whose angular position is changed by wear on the movable member, an adjustable index on the stem which should occupy a definite position with respect to the fixed member when the valve is closed, means comprising registering corrugations on the stem and the index member for locking the index in adjusted position, and means comprising a set screw for securing said index to the stem.

2. In a valve, a fixed valve seat, a movable valve disk, a stem therefor whose angular position is changed by wear on the movable member, an operating handle on the stem, an index on the handle which should occupy a defined normal position with respect to the fixed member when the valve is closed, means comprising registering corrugations on the handle and on the stem for locking the handle in a number of adjusted positions with respect to the stem, and additional means separate from the corrugations for securing said handle to the stem.

3. In a valve, a fixed valve seat, a movable valve disk, a stem therefor whose angular position is changed by wear on the movable member, an operating handle on the stem, an index on the handle which should occupy a defined normal position with respect to the fixed member when the valve is closed, means comprising registering corrugations on the handle and stem respectively for locking the handle in anyone of a number of adjusted positions, a peripheral groove on the stem adjoining the lower end of the corrugations and into which the corrugations extend, and means on the handle engaging in the groove to prevent removal of the handle from the stem.

4. In a valve, a stem the upper portion of which is shaped to receive several forms of handles, means on the end of the stem for securing a handle of one form, and means below the end for securing the handle of another form.

5. In a valve, a stem the upper portion of which is shaped to receive several forms of handles, means comprising a screw-threaded portion on the end of the stem for securing a handle of one form, and means comprising a groove in the stem below the end for securing the handle of another form.

6. In a valve, a stem, said stem having its outer extremity fluted, a neck on the stem adjacent the flutes of less diameter than the stem, a handle having an opening provided with flutes to engage the flutes on the stem, and means on said handle for enveloping said diminished portion of the stem when the parts are assembled.

In testimony whereof I have hereunto set my hand in presence of two subscribing witnesses.

PHILIP MUELLER.

Witnesses:
 W. R. GUSTIN,
 F. L. RIGGIN.